US012769656B2

(12) United States Patent
Kong et al.

(10) Patent No.: US 12,769,656 B2
(45) Date of Patent: Oct. 20, 2026

(54) NEAR MEMORY DEVICE, MEMORY DEVICE, AND ELECTRONIC DEVICE

(71) Applicant: SAMSUNG ELECTRONICS CO., LTD., Suwon-si (KR)

(72) Inventors: Joonho Kong, Suwon-si (KR); Jeongmin Lim, Suwon-si (KR)

(73) Assignees: SAMSUNG ELECTRONICS CO., LTD., Suwon-si (KR); Kyungpook National University Industry-Academic Cooperation Foundation, Daegu (KR)

( * ) Notice: Subject to any disclaimer, the term of this patent is extended or adjusted under 35 U.S.C. 154(b) by 4 days.

(21) Appl. No.: 19/013,254

(22) Filed: Jan. 8, 2025

(65) Prior Publication Data

US 2025/0252052 A1 Aug. 7, 2025

(30) Foreign Application Priority Data

Feb. 6, 2024 (KR) ........................ 10-2024-0018396
Apr. 18, 2024 (KR) ........................ 10-2024-0052397

(51) Int. Cl.
*G06F 12/06* (2006.01)

(52) U.S. Cl.
CPC .................................... *G06F 12/06* (2013.01)

(58) Field of Classification Search
None
See application file for complete search history.

(56) References Cited

U.S. PATENT DOCUMENTS 11,030,997 B2 6/2021 Li et al.
11,599,518 B2 3/2023 Menghani
(Continued)

FOREIGN PATENT DOCUMENTS

CN 116171437 A 5/2023
KR 10-1143508 B1 5/2012
KR 10-2609562 B1 12/2023

OTHER PUBLICATIONS

Liu Ke, et al., "RecNMP: accelerating personalized recommendation with near-memory processing", 2020 ACM/IEEE 47th Annual International Symposium on Computer Architecture (ISCA), pp. 790-803.

(Continued)

*Primary Examiner* — Baboucarr Faal
(74) *Attorney, Agent, or Firm* — Morgan, Lewis & Bockius LLP

(57) ABSTRACT

A memory device including a near-memory device and a far-memory device, wherein the far-memory device stores compressed embedding vectors, the near-memory device including: a buffer to receive a request for pooling an embedding vector and output a hit or miss signal in response to the request, wherein the hit signal includes the embedding vector corresponding to the request; an address calculation circuit to calculate a starting memory address and memory size of the embedding vector in response to the miss signal; a decoding circuit to obtain a compressed embedding vector corresponding to the request from the far-memory device based on the starting memory address and memory size, and output the embedding vector corresponding to the request by decoding the compressed embedding vector; and a pooling circuit to output a pooled embedding vector by performing a pooling operation on the embedding vector.

20 Claims, 13 Drawing Sheets

(56) References Cited

U.S. PATENT DOCUMENTS

| | | | | |
|---|---|---|---|---|
| 11,755,898 | B1 | 9/2023 | Rhee et al. | |
| 2006/0104524 | A1* | 5/2006 | Reid | H04N 19/18 382/253 |
| 2018/0088822 | A1* | 3/2018 | Alameldeen | G06F 12/0873 |
| 2021/0049101 | A1* | 2/2021 | Ray | G06F 12/0868 |
| 2022/0197530 | A1 | 6/2022 | Rhee | |
| 2023/0289272 | A1 | 9/2023 | Queiroz De Macedo et al. | |
| 2024/0338491 | A1* | 10/2024 | Al Faruque | G06F 21/71 |

OTHER PUBLICATIONS

Youngeun Kwon, et al., "TensorDIMM: A Practical Near-Memory Processing Architecture for Embeddings and Tensor Operations in Deep Learning", Micro '52, Oct. 12-16, 2019, Columbus, OH, USA, pp. 740-753.

* cited by examiner

FIG. 6

| TABLE NUMBER | Top-1 exponent $(00)_2$ | Top-2 exponent $(01)_2$ | Top-3 exponent $(10)_2$ |
|---|---|---|---|
| 0 | 01100011 | 01100100 | 01100101 |
| 1 | 01100100 | 01110000 | 01110011 |
| … | … | … | … |
| N-1 | 01111000 | 01111100 | 01100011 |

FIG. 8

| | MT ADDRESS TABLE |
| --- | --- |
| [0] | 0x00000040 |
| [1] | 0x00000140 |
| | … |
| [N-1] | 0x00001040 |

NEAR MEMORY DEVICE, MEMORY DEVICE, AND ELECTRONIC DEVICE

CROSS-REFERENCE TO RELATED APPLICATIONS

This application claims priority under 35 U.S.C. § 119 to Korean Patent Application Nos. 10-2024-0018396, filed on Feb. 6, 2024, and 10-2024-0052397, filed on Apr. 18, 2024, in the Korean Intellectual Property Office, the disclosures of which are incorporated by reference herein in their entireties.

TECHNICAL FIELD

The inventive concept relates to a memory device, and more particularly, to a memory device including a near-memory device and a far-memory device.

DISCUSSION OF RELATED ART

An electronic device typically includes a processor that performs operations and a memory device that stores the operation results. The memory device writes data in response to a write request and retrieves stored data in response to a read request. Memory devices can be classified as volatile, such as dynamic random access memory (DRAM) and static RAM (SRAM), which lose stored data when power is interrupted, or non-volatile, such as flash memory, phase-change RAM (PRAM), magnetic RAM (MRAM), and resistive RAM (RRAM), which retain data even when power is lost.

SUMMARY

Embodiments of the inventive concept provide a method for quantizing and compressing embedding vector components, effectively reducing the data size of an embedding table.

According to an embodiment of the inventive concept, there is provided a memory device including a near-memory device and a far-memory device, wherein the far-memory device stores compressed embedding vectors, the near-memory device including: a buffer configured to receive a request for pooling an embedding vector and to output a hit signal or a miss signal in response to the request, wherein the hit signal includes the embedding vector corresponding to the request; an address calculation circuit configured to calculate a starting memory address and a memory size of the embedding vector corresponding to the request in response to the miss signal; a decoding circuit configured to obtain a compressed embedding vector corresponding to the request from the far-memory device based on the starting memory address and the memory size, and to output the embedding vector corresponding to the request by decoding the compressed embedding vector; and a pooling circuit configured to output a pooled embedding vector by performing a pooling operation on the embedding vector, wherein the pooling circuit obtains the embedding vector from the hit signal or obtains the embedding vector from the decoding circuit, and the buffer stores embedding vectors with access frequencies higher than a pre-set value from all embedding vectors.

According to an embodiment of the inventive concept, there is provided an electronic device including a near-memory device and a far-memory device, the electronic device including a processor configured to control the near-memory device and the far-memory device, wherein the far-memory device stores compressed embedding vectors, the near-memory device including: a buffer configured to receive a request for pooling an embedding vector and to output a hit signal or a miss signal in response to the request, wherein the hit signal comprises the embedding vector corresponding to the request; an address calculation circuit configured to calculate a starting memory address and a memory size of the embedding vector corresponding to the request in response to the miss signal; a decoding circuit configured to obtain a compressed embedding vector corresponding to the request from the far-memory device based on the starting memory address and the memory size of the embedding vector corresponding to the request, and to output the embedding vector corresponding to the request by decoding the compressed embedding vector; and a pooling circuit configured to output a pooled embedding vector by performing a pooling operation on the embedding vector, wherein the pooling circuit obtains the embedding vector from the hit signal of the buffer or obtains the embedding vector from the decoding circuit, and the buffer stores embedding vectors with access frequencies higher than a pre-set value from all embedding vectors.

According to an embodiment of the inventive concept, there is provided a near-memory device including: a buffer configured to receive a request to pooling an embedding vector and output a hit signal or a miss signal in response to the request, wherein the hit signal includes the embedding vector corresponding to the request; an address calculation circuit configured to calculate a starting memory address and a memory size of the embedding vector corresponding to the request in response to the miss signal; a decoding circuit configured to obtain a compressed embedding vector corresponding to the request from a far-memory device based on the starting memory address and the memory size of the embedding vector corresponding to the request, and to output the embedding vector corresponding to the request by decoding the compressed embedding vector; and a pooling circuit configured to output a pooled embedding vector by performing a pooling operation on the embedding vector, wherein the pooling circuit obtains the embedding vector from the hit signal of the buffer or obtains the embedding vector from the decoding circuit, and wherein the buffer stores embedding vectors with access frequencies higher than a pre-set value from all embedding vectors.

BRIEF DESCRIPTION OF THE DRAWINGS

Embodiments of the inventive concept will be more clearly understood from the following detailed description taken in conjunction with the accompanying drawings in which:

FIG. 6 is an exponent table according to an embodiment;

FIG. 8 is a diagram illustrating a mapping table address table according to an embodiment;

DETAILED DESCRIPTION OF THE EMBODIMENTS

Figure 1:
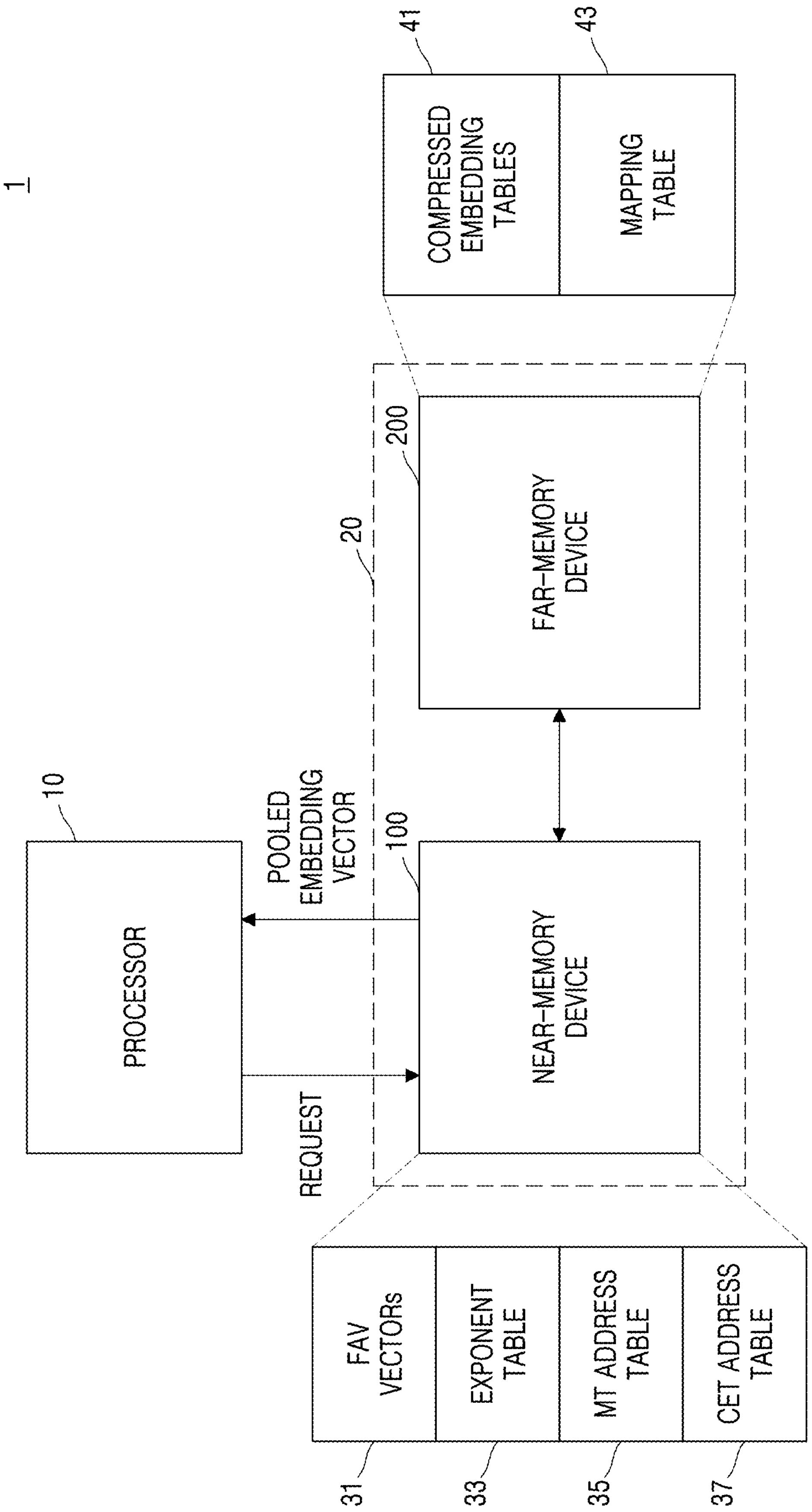
FIG. 1 is a block diagram of an electronic device according to an embodiment.

FIG. 1 is a block diagram of an electronic device according to an embodiment.

Referring to FIG. 1, an electronic device 1 may include a processor 10 and a memory device 20. The memory device 20 may include a near-memory device 100 and a far-memory device 200. The electronic device 1 may be a computing system configured to process various information, such as a personal computer (PC), a server, a workstation, a tablet PC, a smartphone, a digital camera, a dashboard camcorder, etc.

The processor 10 may also be referred to as a System-On-Chip (SoC). An SoC may refer to a chip where various circuits and modules that perform different operations are implemented into a single integrated circuit.

For example, the processor 10 may include a central processing unit (CPU) and a cache memory. The CPU may control overall operations of the electronic device 1. The cache memory may function as a buffer memory for high-speed operations of the processor 10. According to some embodiments, the operation speed of the processor 10 may be faster than the data input/output speed of off-chip memories, such as the near-memory device 100 and the far-memory device 200. To reduce bottlenecks caused by these speed differences, the cache memory may provide a high-speed buffer memory that supports the processor 10. Additionally, according to some embodiments, the processor 10 may include an accelerator, which assists in its operation. For example, the accelerator may be a hardware device for performing graphics processing, machine learning, neural network computation, etc.

The processor 10 may control overall operations of the electronic device 1. The processor 10 may communicate with the near-memory device 100 and the far-memory device 200.

For example, the processor 10 may control overall operations of the near-memory device 100. The processor 10 may store data in the near-memory device 100 or may read data stored in the near-memory device 100. Additionally, the processor 10 may control overall operations of the far-memory device 200. The processor 10 may store data in the far-memory device 200 or may read data stored in the far-memory device 200.

The near-memory device 100 may store data or output stored data based on communication with the processor 10. For example, the near-memory device 100 may be a volatile memory device such as a dynamic random access memory (DRAM), and may be packaged together with the processor 10. Positioned physically closer to the processor 10 than the far-memory device 200, the near-memory device 100 offers superior latency and data input/output speed compared to the far-memory device 200.

The far-memory device 200 may store data or output stored data based on communication with the processor 10. For example, the far-memory device 200 may be a volatile memory device such as a DRAM, and may be housed in a separate package from the processor 10. Positioned farther from the processor 10 than the near-memory device 100, the far-memory device 200 may be superior in terms of the additional connectivity and greater expansion capacity.

According to some embodiments, the near-memory device 100 and the far-memory device 200 may be manufactured through different processes. For example, the near-memory device 100 may exhibit lower latency and faster data input/output speed than the far-memory device 200, but the near-memory device 100 may have a smaller storage capacity than the far-memory device 200. The near-memory device 100 may be manufactured through a logic process. According to another embodiment, the far-memory device 200 may have a larger storage capacity than the near-memory device 100, but may exhibit higher latency and slower data input/output speeds than the near-memory device 100. The far-memory device 200 may be manufactured through a legacy process. However, the inventive concept is not limited thereto, and the near-memory device 100 and the far-memory device 200 may each be manufactured through a combination of a logic process and a legacy process.

Additionally, according to some embodiments, the far-memory device 200 may include or refer to a storage device. The storage device may store data or output stored data under the control of the processor 10. The storage device may exhibit a relatively slow data input/output speed and a large storage capacity as compared to the cache memory, the near-memory device 100, and the far-memory device 200. For example, the storage device may be a non-volatile memory device, such as a flash memory device.

The near-memory device 100 may process a pooling operation on an embedding vector through near-memory processing. In other words, the near-memory device 100 may perform a pooling operation on an embedding vector using near-memory processing.

Detailed descriptions thereof will be given below with reference to FIGS. 2 and 12.

By performing quantization and compression methods for embedding vector components described in FIGS. 2 to 12, the data size of an embedding table may be effectively reduced. Additionally, by performing near-memory processing described in FIGS. 2 to 12, both the time and energy consumption for embedding table lookup and pooling may be effectively reduced.

Figure 2:
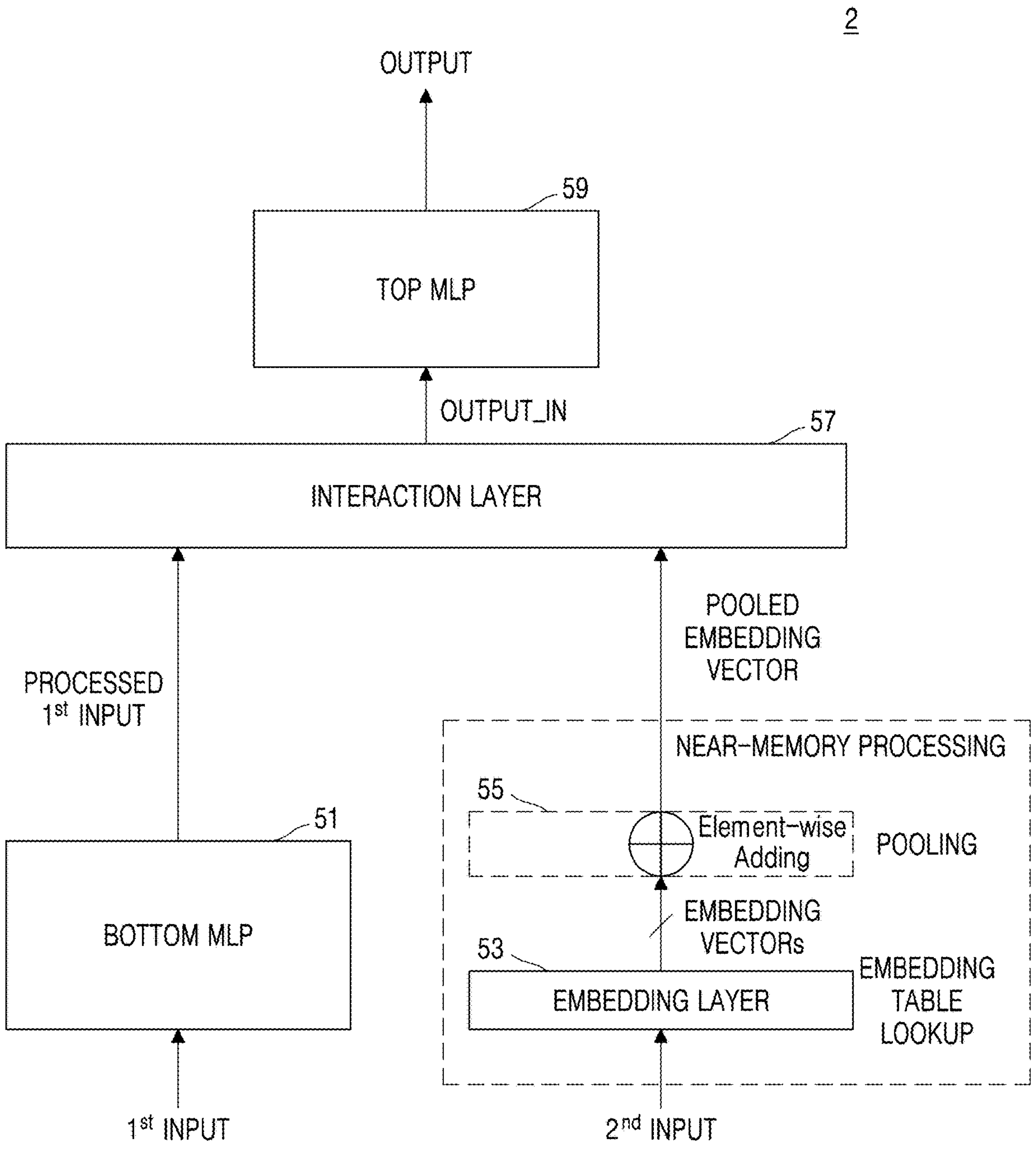
FIG. 2 is a block diagram showing a deep neural network (DNN) implemented by an electronic device, according to an embodiment.

FIG. 2 is a block diagram showing a deep neural network (DNN) implemented by an electronic device, according to an embodiment. Hereinafter, the DNN may be referred to as a neural network.

Near-memory processing of the electronic device 1 described above with reference to FIG. 1 may be applied to various neural networks.

According to some embodiments, near-memory processing of the electronic device 1 described above with reference to FIG. 1 may be applied to a neural network 2 shown in FIG. 2. Here, the neural network 2 may refer to a deep learning recommendation model (DLRM).

The neural network 2 may include a bottom multi-layer perceptron (MLP) 51, an embedding layer 53, a pooling layer 55, an interaction layer 57, and a top MLP 59. The embedding layer 53 and the pooling layer 55 may be implemented through near-memory processing of the electronic device 1 described above with reference to FIG. 1.

The neural network 2 may be trained with data related to user preferences, making it well-suited for recommending products tailored to users based on the preferences of a plurality of users.

Training the neural network 2 may include repeatedly performing a plurality of learning stages. Each training stage may include a forward propagation operation to calculate the value of a loss function for a set of given weights, a calculation operation to determine at least one gradient of the loss function for the given weights, and a back propagation operation to update the weights based on the calculated gradient.

In the forward propagation operation during both the inference stage of the neural network 2 and the training stage of the neural network 2, the neural network 2 may receive a first input $1^{st}$ INPUT and a second input $2^{nd}$ INPUT as input values.

In detail, the first input $1^{st}$ INPUT may be processed by the bottom MLP 51, and the second input $2^{nd}$ INPUT may be processed by the embedding layer 53 and the pooling layer 55.

The first input $1^{st}$ INPUT may be an input including continuous and dense features. A continuous feature may refer to a feature expressed through continuous values, such as price, age, annual salary, etc. A dense feature refers to a case where the number of elements with a value of 0 in an input expressed as a matrix or vector (i.e., an input matrix or input vector) is smaller than a pre-set number. In other words, the first input $1^{st}$ INPUT is expressed as an input matrix (or input vector) containing continuous values, wherein the number of elements having the value of 0 from among the elements of the input matrix (or input vector) may be smaller than the pre-set number.

Additionally, the second input $2^{nd}$ INPUT may be an input containing categorical and sparse features. A categorical feature may refer to a feature expressed through discrete values such as gender and age. A sparse feature refers to a case where the number of elements with a value of 0 in an input expressed as a matrix or vector (i.e., an input matrix or input vector) is greater than or equal to a pre-set number. In other words, the second input $2^{nd}$ INPUT is expressed as an input matrix (or input vector) containing discrete values, wherein the number of elements having the value of 0 from among the elements of the input matrix (or input vector) may be greater than or equal to the pre-set number.

In other words, the neural network 2 may receive both continuous and dense features and categorical and sparse features as input values and may process both of the continuous and dense features and the categorical and sparse features.

The first input $1^{st}$ INPUT may be processed by the bottom MLP 51. The bottom MLP 51 may receive the first input $1^{st}$ INPUT as an input value and provide a processed first input PROCESSED $1^{st}$ INPUT, which is processed by performing a forward propagation operation on the first input $1^{st}$ INPUT, to the interaction layer 57.

The second input $2^{nd}$ INPUT may be processed by the embedding layer 53 and the pooling layer 55. The second input $2^{nd}$ INPUT may include at least one table index and at least one row index.

The embedding layer 53 may include a plurality of embedding tables. When the neural network 2 shown in FIG. 2 refers to a deep learning recommendation model (DLRM), each embedding table may represent user-related and/or item-related information. The purpose of generating a pooled embedding vector POOLED EMBEDDING VECTOR by accessing a plurality of embedding tables is to extract information related to interactions between specific users, user groups, specific items, or item groups.

Additionally, one embedding table may include a plurality of embedding vectors. Each element included in each of the embedding vectors may be in the 32-bit single precision floating point format. However, the inventive concept is not limited thereto, and each element included in each of the embedding vectors may be expressed in other forms as well.

The embedding layer 53 may identify a corresponding embedding table from among a plurality of embedding tables based on a table index. Additionally, the embedding layer 53 may identify a corresponding row from among a plurality of rows included in the corresponding embedding table based on a row index. In other words, the embedding layer 53 may provide an embedding vector corresponding to a specific row of the embedding table, identified by the table index and row index, to the pooling layer 55.

In other words, the embedding layer 53 may perform an embedding table lookup operation based on the table index and row index of the second input $2^{nd}$ INPUT, thereby providing at least one embedding vector to the pooling layer 55.

The pooling layer 55 may receive at least one embedding vector as an input value and perform a pooling operation on the at least one embedding vector, thereby providing a pooled embedding vector POOLED EMBEDDING VECTOR to the interaction layer 57. Referring to FIG. 2, according to an embodiment, the pooling operation may be an element-wise adding operation. However, the inventive concept is not limited thereto, and the pooling operation may be a concatenation operation or a multiplication operation for elements.

The processing operation of the embedding layer 53 and the pooling layer 55 may be implemented as the near-memory processing within the electronic device 1 described above with reference to FIG. 1.

The interaction layer 57 may receive a processed first input PROCESSED $1^{st}$ INPUT and a pooled embedding vector POOLED EMBEDDING VECTOR as input values. The interaction layer 57 may then provide an intermediate output value OUTPUT_IN to the top MLP 59 by combining the processed first input PROCESSED $1^{st}$ INPUT, based on a feature interaction function, with the pooled embedding vector POOLED EMBEDDING VECTOR.

The top MLP 59 may receive the intermediate output value OUTPUT_IN as an input value and output a final output value OUTPUT by performing a forward propagation operation on the intermediate output value OUTPUT_IN.

For example, when the neural network 2 shown in FIG. 2 refers to a DLRM, the final output value OUTPUT may represent a predicted click-through rate (CTR).

The processing operations of the bottom MLP 51, the interaction layer 57, and the top MLP 59 may be implemented by the processor 10 described above with reference to FIG. 1. Here, the bottom MLP 51 and/or the top MLP 59 implemented by the processor 10 described above with reference to FIG. 1 may perform weight application and a multiplication and accumulation (MAC) operation on an input value.

According to the inventive concept, the processing operation of the embedding layer 53 and the pooling layer 55 may be implemented as the near-memory processing within the electronic device 1 described above with reference to FIG. 1.

Figure 3:
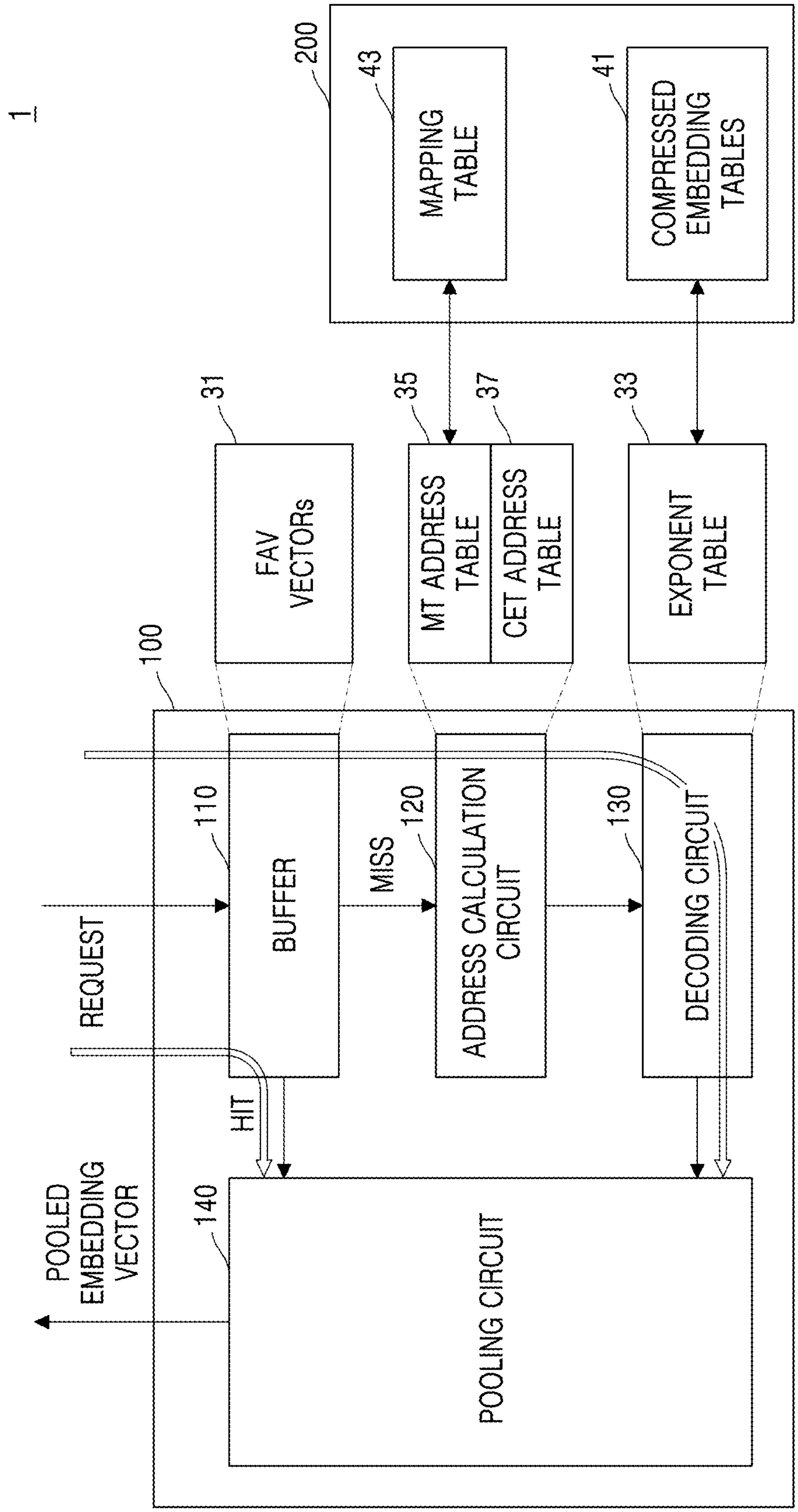
FIG. 3 is a block diagram of a memory device according to an embodiment.

FIG. 3 is a block diagram of a memory device according to an embodiment.

Referring to FIG. 3, a near-memory device 100 may include a buffer 110, an address calculation circuit 120, a decoding circuit 130, and a pooling circuit 140.

The buffer 110 may receive a request REQUEST from the processor 10. Additionally, the buffer 110 may output a hit signal HIT or a miss signal MISS in response to the request REQUEST. The hit signal HIT may include an embedding vector corresponding to the request REQUEST.

The buffer 110 may store embedding vectors whose access frequencies are higher than a pre-set value from among embedding vectors included in a plurality of embedding tables. The stored embedding vectors may be referred to as frequently accessed vectors (FAVs) 31.

The buffer 110 may output the hit signal HIT when the embedding vector corresponding to the request REQUEST matches one of the stored embedding vectors and may output the miss signal MISS when the embedding vector corresponding to the request REQUEST matches none of the stored embedding vectors.

According to some embodiments, buffer 110 may be implemented with a memory. For example, the buffer 110 may be implemented with a volatile memory such as DRAM, mobile DRAM, static RAM (SRAM), phase-change RAM (PRAM), ferroelectric RAM (FRAM), resistive RAM (RRAM), and/or magnetic RAM (MRAM).

The address calculation circuit 120 may calculate a starting memory address and a memory size of the embedding vector corresponding to the request REQUEST in response to the miss signal MISS from the buffer 110.

The decoding circuit 130 may obtain a compressed embedding vector corresponding to the request REQUEST from the far-memory device 200 based on a calculated starting memory address and a calculated memory size of the embedding vector corresponding to the request REQUEST.

Additionally, the decoding circuit 130 may output the embedding vector corresponding to the request REQUEST by decoding the compressed embedding vector.

The decoding circuit 130 may store an exponent table 33. Additionally, the address calculation circuit 120 may store a mapping table (MT) address Table 35 and a CET address table 37. Detailed descriptions thereof will be given later with reference to another drawing.

The pooling circuit 140 may output a pooled embedding vector by performing a pooling operation on an embedding vector.

The pooling circuit 140 may obtain an embedding vector from the hit signal HIT of the buffer 110 or obtain an embedding vector from a decoding circuit responding to the miss signal MISS of the buffer 110.

Hereinafter, near-memory processing of the electronic device 1 will be described by dividing the near-memory processing into an offline section and an online section. In detail, an offline section will be described with reference to FIGS. 4 to 8, and an online section will be described with reference to FIGS. 9 to 12.

Figure 4:
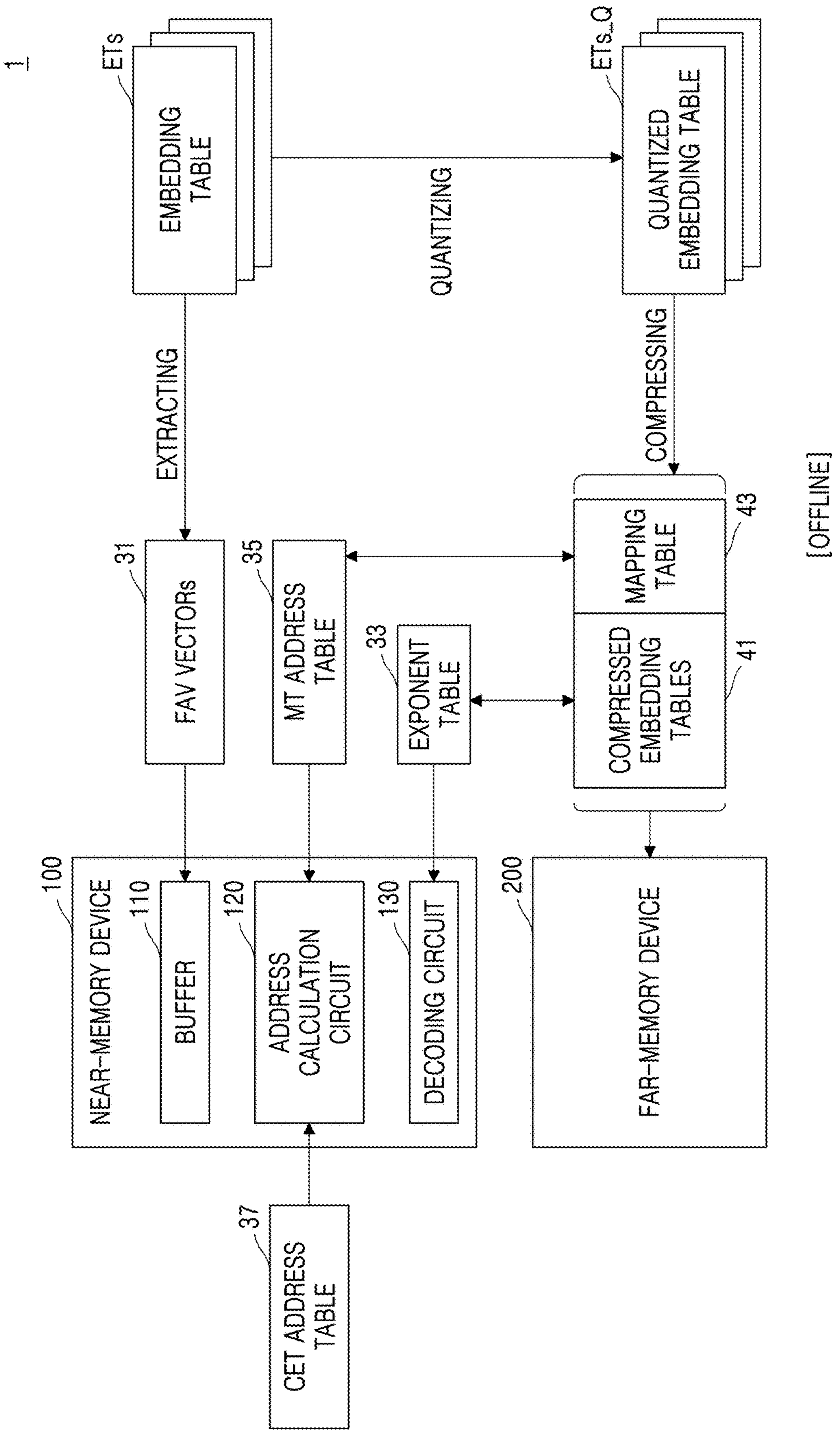
FIG. 4 is a block diagram illustrating the operation of an electronic device in an offline section, according to an embodiment.
Figure 5:
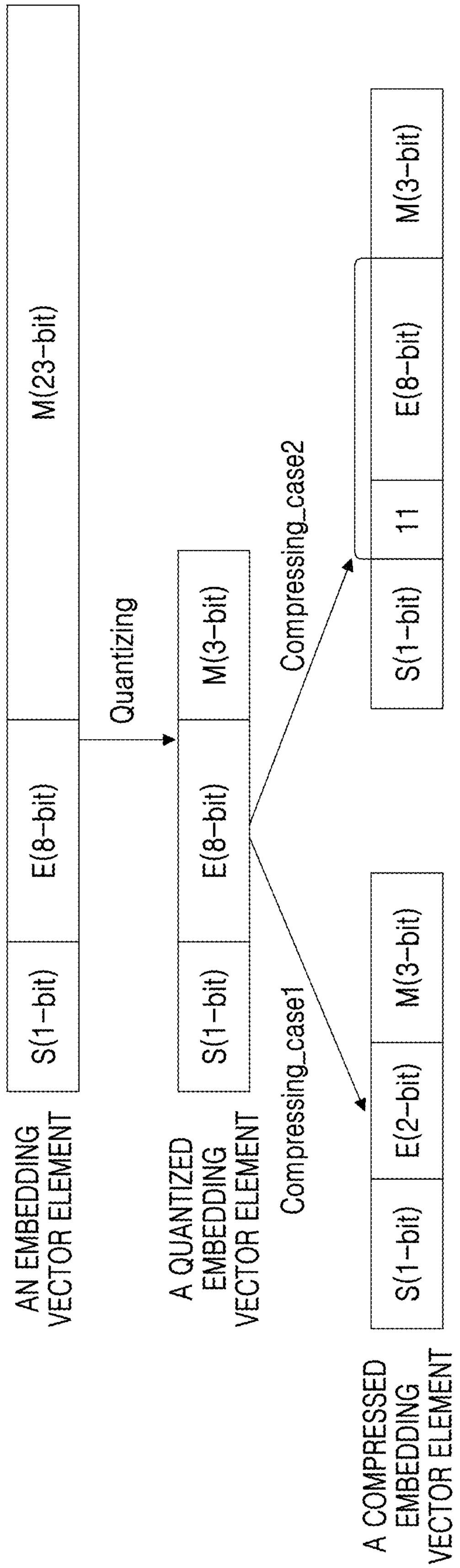
FIG. 5 is a block diagram illustrating a quantizing operation and a compressing operation according to an embodiment.
Figure 7:
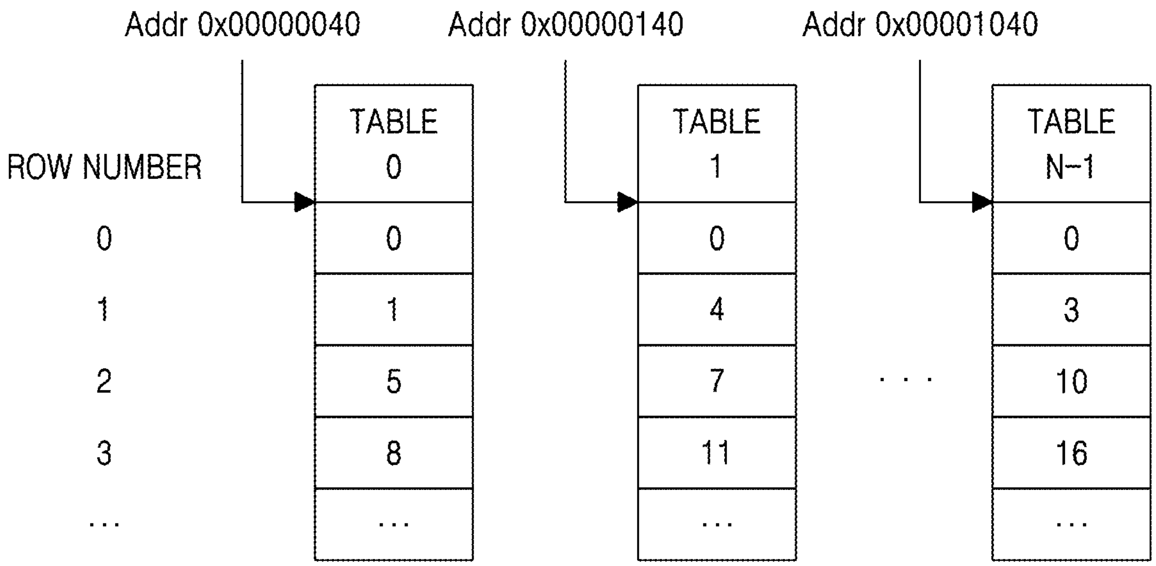
FIG. 7 is a diagram illustrating a mapping table according to an embodiment.

FIG. 4 is a block diagram illustrating the operation of an electronic device in an offline section, according to an embodiment. FIG. 5 is a block diagram illustrating a quantizing operation and a compressing operation according to an embodiment. FIG. 6 is an exponent table according to an embodiment. FIG. 7 is a diagram illustrating a mapping table according to an embodiment. FIG. 8 is a diagram illustrating an MT address table according to an embodiment.

FIG. 4 is a block diagram for describing near-memory processing of the electronic device 1 according to an embodiment in an offline section.

The offline section may refer to a section in which data or a task is prepared or processed in advance. In other words, the offline section refers to a phase where data or tasks are prepared or processed in advance. For example, the process of training the neural network 2 described with reference to FIG. 2 may be included in the offline section. In other words, in the offline section, the electronic device 1 may train the neural network 2 based on training data. The trained neural network 2 may be used in the online section later.

Additionally, when training of the neural network 2 is completed, the electronic device 1 may generate embedding vectors for the trained neural network 2. Additionally, the electronic device 1 may collect the embedding vectors and generate a plurality of embedding tables ETs.

According to the inventive concept, the electronic device 1 may also perform the process of quantizing the elements of each embedding vector for the neural network 2, which is trained in the offline section, and compressing quantized elements.

Referring to FIG. 4, the electronic device 1 may generate a plurality of quantized embedding tables ETs_Q by quantizing elements of embedding vectors included in the plurality of embedding tables ETs.

The electronic device 1 may generate a plurality of compressed embedding tables 41 by compressing the plurality of quantized embedding tables ETs_Q. Here, the electronic device 1 may store the plurality of compressed embedding tables 41 in the far-memory device 200 described with reference to FIG. 1.

The electronic device 1 may generate metadata by compressing the plurality of quantized embedding tables ETs_Q. The metadata may include the exponent table 33 described with reference to FIGS. 5 and 6, a mapping table 43 described with reference to FIG. 7, and the MT address table 35 and the CET address table 37 described with reference to FIG. 8.

Quantizing and compressing operations according to an embodiment will be described with reference to FIG. 5.

Referring to FIG. 5, one embedding vector element from among elements of each of the embedding vectors included in each of the plurality of embedding tables ETs is shown. In other words, one element from each embedding vector in the plurality of embedding tables ETs is illustrated.

Each element included in each of the embedding vectors may be in the 32-bit single precision floating point format. In other words, the one embedding vector element may be a value in the floating-point 32-bit (FP32) format.

Referring to FIG. 5, the one embedding vector element may include a sign bit S with 1 bit allocated, exponent bits E with 8 bits allocated, and Mantissa bits M with 23 bits allocated.

The electronic device 1 may perform a quantization operation by maintaining a pre-set number of the most significant bits from the mantissa bits M of each elements in each of the embedding vectors in each of the plurality of embedding tables ETs and removing the remaining mantissa bits M.

Referring to FIG. 5, the electronic device 1 may quantize one embedding vector element by maintaining the most significant bit MSB, the second most significant bit SMSB, and the third most significant bit TMSB from among the mantissa bits M of the one embedding vector element and removing the remaining bits of the mantissa bits M. For example, the electronic device 1 may quantize an embedding vector element by retaining the most significant bit MSB, the second most significant bit SMSB, and the third most significant bit TMSB from the mantissa bits M of the embedding vector element, while removing the remaining mantissa bits M.

In other words, the electronic device 1 may quantize the one embedding vector element by leaving only the three most significant bits from among the mantissa bits M and removing the remaining 20 bits of the mantissa bits M, thereby generating one quantized embedding vector element.

According to the inventive concept, by leaving only the three most significant bits from among the mantissa bits M and removing the remaining 20 bits of the mantissa bits M, the quantized embedding vector element can closely approximate the original value, thereby minimizing its impact on the neural network 2.

The electronic device 1 may generate the plurality of quantized embedding tables ETs_Q by maintaining a pre-set number of the most significant bits from among the mantissa bits M of each of elements of each of embedding vectors included in each of the plurality of embedding tables ETs and removing the remaining bits of the mantissa bits M. In other words, the electronic device 1 may generate the plurality of quantized embedding tables ETs_Q by retaining a pre-set number of the most significant bits from the mantissa bits M of each element in the embedding vectors within the embedding tables ETs and removing the remaining mantissa bits M.

Additionally, based on the bit values of the exponent bits E of each of the quantized elements of each of the embedding vectors included in each of the plurality of quantized embedding tables ETs_Q, the electronic device 1 may map each of the exponent bits E to the exponent bits E with a pre-set number of bits or add a pre-set number of bits with a specific bit value between the sign bit S and an exponent bit E.

Referring to FIG. 5, based on the bit values of the exponent bits E of the one quantized embedding vector element, the electronic device 1 may map each exponent bit E to the exponent bits E having two bits (Compressing_case1) or add two bits having a specific bit value between the sign bit S and the exponent bit E (Compressing_case2).

The bit value of the exponent bits E, which has two bits to be mapped, may be any one of $00_{(2)}$, $01_{(2)}$, and $10_{(2)}$. The value of the two bits added between the sign bit S and the exponent bit E may be $11_{(2)}$.

In other words, the electronic device 1 may generate one compressed embedding vector element by mapping each exponent bit E to the exponent bits E having two bits (Compressing_case1) or adding two bits having a specific bit value between the sign bit S and the exponent bit E (Compressing_case2).

Referring to FIG. 5, when the exponent bit E of the one quantized component is mapped to the exponent bits E having two bits (Compressing_case1), the size of the one compressed embedding vector element may be a total of 6 bits.

Referring to FIG. 5, when two bits having a specific bit value are added between the sign bit S and the exponent bit E of the one quantized embedding vector element (Compressing_case2), the size of the one compressed embedding vector element may be a total of 14 bits.

According to the inventive concept, lossless compression for quantized elements may be implemented by mapping each exponent bit E to the exponent bits E having two bits (Compressing_case1) or adding two bits having a specific bit value between the sign bit S and the exponent bit E (Compressing_case2).

This is because more than 80% of the exponent bits E of the elements in an embedding vector for the trained neural network 2 each have one of three values: a first bit value, a second bit value, and a third bit value. The first bit value may be referred to as top-1, the second bit value may be referred to as top-2, and the third bit value may be referred to as top-3. In other words, the electronic device 1 may compress an embedding vector by mapping the three most frequently appearing exponent bits E into the form of $(00)_2$, $(01)_2$, and $(10)_2$, respectively.

Additionally, by mapping the exponent bit E to the exponent bits E having two bits (Compressing_case1), the electronic device 1 may generate the exponent table 33 including a corresponding first bit value, a corresponding second bit value, and corresponding third bit value respectively corresponding to the plurality of embedding tables ETs.

Referring back to FIG. 4, the metadata may include the exponent table 33. The Exponent Table 33 may be a table indicating bit values respectively corresponding to top-1, top-2, and top-3 of the plurality of embedding tables ETs described above with reference to FIG. 6.

In other words, the exponent table 33 may include metadata for 2-bit mapping (Compressing_case1) of the exponent bit E.

Referring to FIG. 4, in the offline section, the electronic device 1 may store the generated exponent table 33 in the decoding circuit 130 of the near-memory device 200.

Referring to FIG. 6, it may be seen that an exponent table for N embedding tables is shown. Here, N is a positive integer.

Referring to FIG. 6, in a 0-th embedding table (0), an exponent bit E $01100011_{(2)}$ may be mapped to $00_{(2)}$, an exponent bit E $01100100_{(2)}$ may be mapped to $01_{(2)}$, and an exponent bit E $01100101_{(2)}$ may be mapped to $10_{(2)}$. In a first embedding table (1), an exponent bit E $01100100_{(2)}$ may be mapped to $00_{(2)}$, an exponent bit E $01110000_{(2)}$ may be mapped to $01_{(2)}$, and an exponent bit E $01110011_{(2)}$ may be mapped to $10_{(2)}$. In an N−1th embedding table (N−1), an exponent bit E $01111000_{(2)}$ may be mapped to $00_{(2)}$, an exponent bit E $01111100_{(2)}$ may be mapped to $01_{(2)}$, and an exponent bit E $01100011_{(2)}$ may be mapped to $10_{(2)}$.

Referring back to FIG. 4, the metadata may include the mapping table 43. The mapping table 43 may represent metadata for calculating the starting memory address of each of embedding vectors.

According to an embodiment, the value of each row of the mapping table for one embedding table may represent the number of elements (Compressing_case2 of FIG. 5) compressed to 14 bits from among elements from a 0-th row (i.e., the initial row) to a row immediately before a corresponding row of the mapping table.

For example, the value of the 0-th row (i.e., the initial row) of the mapping table for an embedding table may be 0, the value of the first row may represent the number of elements compressed to 14 bits from the embedding vector corresponding to the 0-th row, and the value of the second row may represent the number of elements compressed to 14 bits from the embedding vectors corresponding to both the 0-th row and the first row.

Referring to FIG. 7, a mapping table for N embedding tables is shown. Here, N is a positive integer.

Referring to FIG. 7, in a 0-th mapping table for the 0-th embedding table, the value of the 0-th row may be 0. In the 0-th mapping table for the 0-th embedding table, the value of a first row, which is 1, may indicate that the number of elements compressed to 14 bits from among elements of an embedding vector corresponding to the 0-th row is 1, the value of a second row, which is 5, may indicate that the number of elements compressed to 14 bits from among elements of embedding vectors corresponding to from the 0-th row to the first row (i.e., the embedding vector corresponding to the 0-th row and an embedding vector corresponding to the first row) is 5, and the value of a third row, which is 8, may indicate that the number of elements compressed to 14 bits from among elements of embedding vectors corresponding to from the 0-th row to the second row (i.e., the embedding vector corresponding to the 0-th row, the embedding vector corresponding to the first row, and an embedding vector corresponding to the second row) is 8.

Additionally, in the offline section, the electronic device 1 may store the mapping table 43 in the far-memory device 200. Here, since the size of the mapping table 43 is large, the electronic device 1 may store the mapping table in the far-memory device 200.

Additionally, since the mapping table 43 is stored in the far-memory device 200, the near-memory device 100 may store an MT address to access the mapping table 43 stored in the far-memory device 200. An MT address may refer to the physical memory address of the first row of a corresponding mapping table. In other words, an MT address may be a physical memory address of the far-memory device 200 with respect to the first row of a corresponding mapping table.

Referring back to FIG. 4, the metadata may include the MT address table 35. The MT address table 35 may be a table representing all MT addresses.

In other words, the MT address table 35 may contain metadata related to the physical memory addresses of the first row in all mapping tables.

Referring to FIG. 4, the electronic device 1 may generate the MT address table 35 including the MT addresses described above, and the generated MT address table 35 may be stored in the address calculation circuit 120 of the near-memory device 100.

In other words, in the offline section, the electronic device 1 may store the MT address table 35 in the address calculation circuit 120 of the near-memory device 100.

Referring to FIG. 8, an MT address table for the mapping table of FIG. 7 is shown.

Referring to FIGS. 7 and 8, a value 0x00000040 corresponding to the 0-th row of the MT address table may represent the physical memory of the 0-th row (i.e., the initial row) of the 0-th mapping table. A value 0x00000140 corresponding to the first row of the MT address table may represent the physical memory of the 0-th row (i.e., the initial row) of the first mapping table. A value 0x00001040 corresponding to an (N−1)-th row of the MT address table may represent the physical memory of the 0-th row (i.e., the initial row) of an (N−1)-th mapping table.

The near-memory device 100 may store compressed embedding table (CET) addresses to access the compressed embedding tables 41 stored in the far-memory device 200. A CET address may refer to the physical memory address of the first row of a corresponding embedding table. In other words, the CET address may be a physical memory address of the far-memory device 200 with respect to the first row of the corresponding embedding table.

Referring back to FIG. 4, the metadata may include the CET address table 37. Here, the CET address table 37 may be a table representing all CET addresses.

In other words, the CET address table 37 may include metadata related to the physical memory addresses of the first row of all embedding tables.

Referring to FIG. 4, the electronic device 1 may generate the CET address table 37 including the CET addresses described above, and the generated CET address table 37 may be stored in the address calculation circuit 120 of the near-memory device 100.

In other words, in the offline section, the electronic device 1 may store the CET address table 37 in the address calculation circuit 120 of the near-memory device 100.

The MT address table 35 and the CET address table 37 may later be used by the address calculation circuit 120 of the near-memory device 100 in the online section.

Returning back to FIG. 4, the electronic device 1 may extract embedding vectors whose access frequencies are higher than a pre-set value from among embedding vectors included in each of the plurality of embedding tables ETs and store the extracted embedding vectors in the buffer 110 of the near-memory device 100. Here, the extracted embedding vectors may be referred to as frequently accessed vectors (FAVs).

The above-stated access refers to access performed by the neural network 2 described with reference to FIG. 2. Additionally, the above-stated access frequency refers to the frequency with which one embedding vector in a table is accessed, relative to the total number of accesses to the plurality of embedding vectors in the corresponding embedding table. According to some embodiments, the access frequency may be a statistical value based on an actual data set used to train the neural network 2.

The electronic device 1 may store the FAVs 31 in the buffer 110 of the near-memory device 100 by extracting the FAVs 31 from the plurality of embedding tables ETs based on access frequencies of respective embedding vectors.

According to some embodiments, the above-described access frequency may be defined as Equation 1 below.

$$Cov_i = \frac{AC_i}{AC_{total}} \qquad \text{[Equation 1]}$$

Here, $Cov_i$ may denote the access frequency of an i-th embedding vector, $AC_i$ may denote the number of accesses to the i-th embedding vector, and $AC_{total}$ may denote the total number of accesses to all embedding vectors included in an embedding table including the i-th embedding vector. Additionally, here, the access frequency $Cov_i$ is different from the hit rate, because the access frequency $Cov_i$) is a parameter for a specific embedding vector, and the hit rate is a hit signal output frequency of the buffer 110, e.g., a parameter for the buffer 110.

In other words, the electronic device 1 may extract embedding vectors whose access frequencies ($Cov_i$) are higher than a pre-set value and store the extracted embedding vectors in the buffer 110 of the near-memory device 100.

According to some embodiments, the electronic device 1 may store 16 embedding vectors with high access frequencies $Cov_i$ from among all embedding vectors included in one embedding table, in the buffer 110 of the near-memory device 100. In addition, according to some embodiments, the electronic device 1 may store 64 embedding vectors with high access frequencies $Cov_i$ from among all embedding vectors included in one embedding table, in the buffer 110 of the near-memory device 100.

Figure 9:
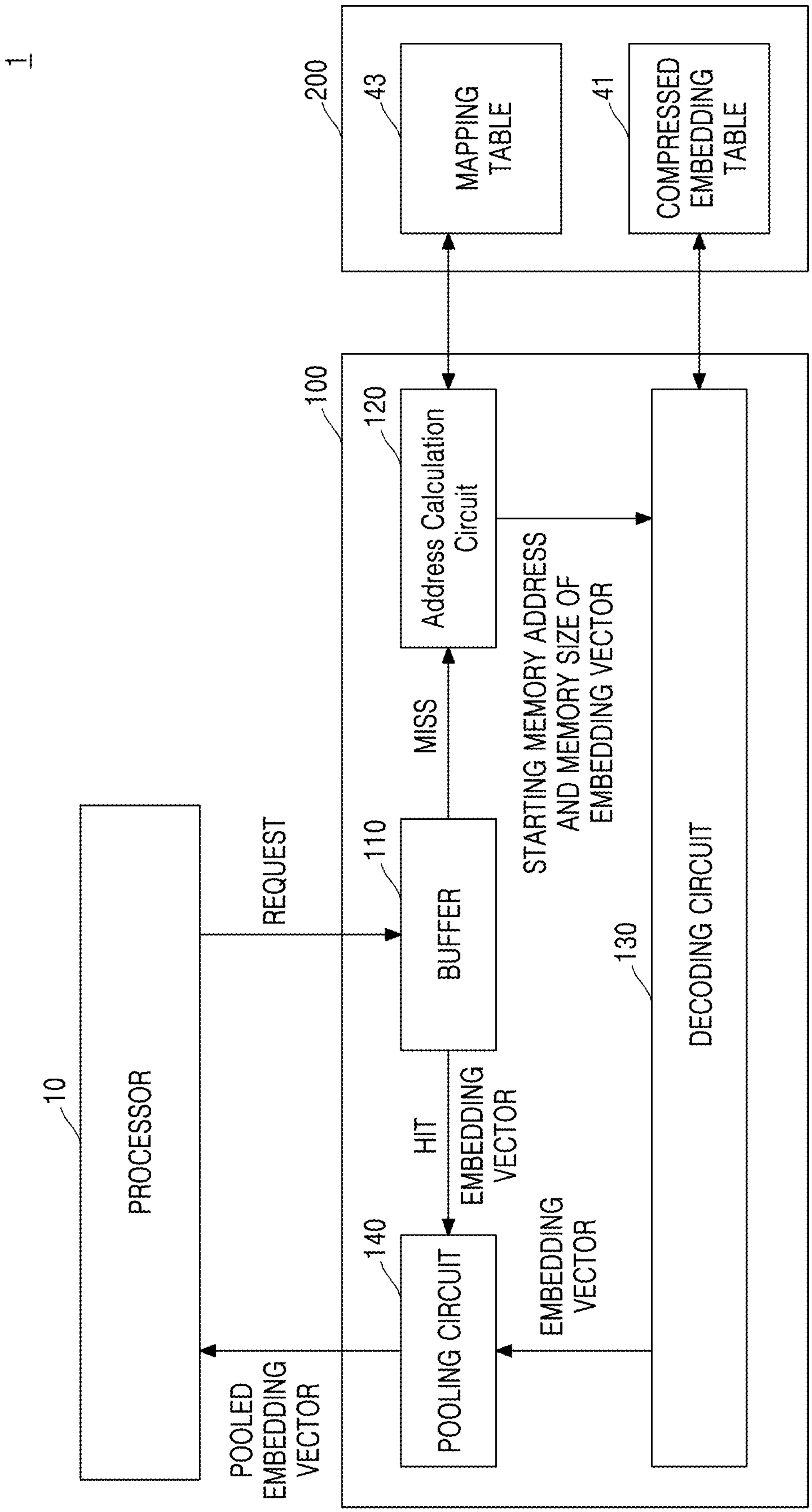
FIG. 9 is a block diagram illustrating the operation of an electronic device in an online section, according to an embodiment.
Figure 10:
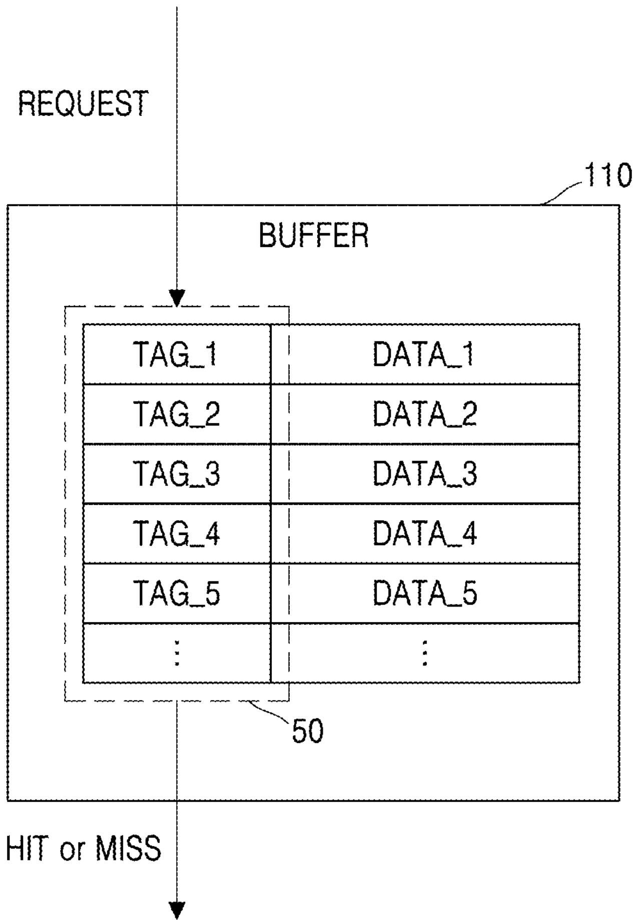
FIG. 10 is a block diagram illustrating the operation of a buffer included in a near-memory device in an online section, according to an embodiment.
Figure 11:
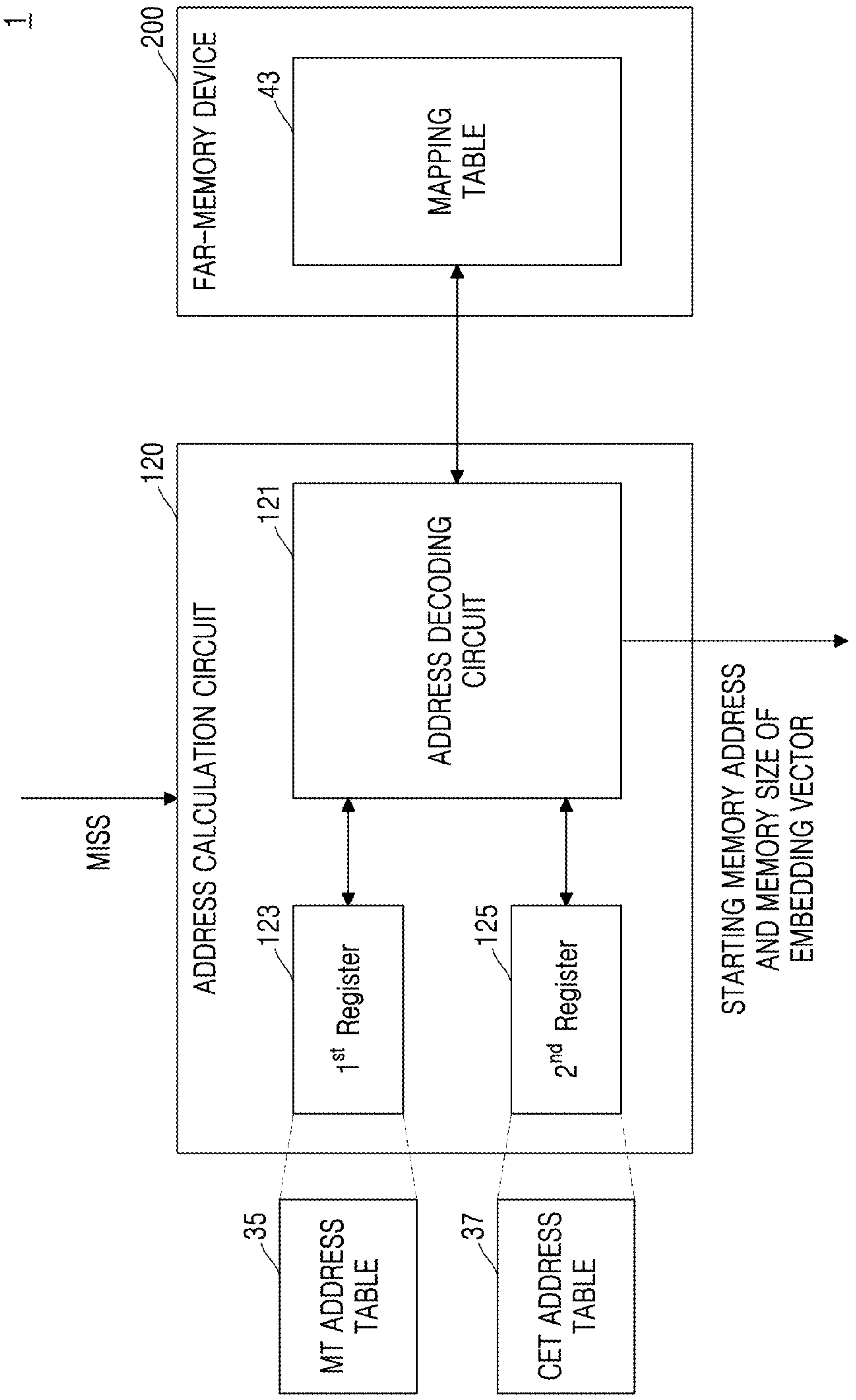
FIG. 11 is a block diagram illustrating the operation of an address calculation circuit included in a near-memory device in an online section, according to an embodiment.

FIG. 9 is a block diagram illustrating the operation of an electronic device in an online section, according to an embodiment. FIG. 10 is a block diagram illustrating the operation of a buffer included in a near-memory device in an online section, according to an embodiment. FIG. 11 is a block diagram illustrating the operation of an address calculation circuit included in a near-memory device in an online section, according to an embodiment. FIG. 12 is a block diagram illustrating the operation of a decoding circuit included in a near-memory device in an online section, according to an embodiment.

Here, the online section may refer to a section in which data is processed in real time or tasks are performed in response to real-time situations. In other words, the online section refers to a phase where data is processed in real time or tasks are performed in response to real-time situations. For example, the process of making predictions on actual data using the neural network 2 described with reference to FIG. 2 may be included in the online section. In other words, the online section may include a section where the neural network 2 performs inference operations. During the online section, the neural network 2 may receive data in real time and perform inference operations on this data.

Referring to FIG. 9, the processor 10 may output a request REQUEST for pooling of an embedding vector to the near-memory device 100. Here, the request REQUEST may include an embedding table index including the corresponding embedding vector and the index of the corresponding embedding vector in the embedding table.

Referring to FIG. 9, the buffer 110 may receive a request REQUEST from the processor 10. Additionally, the buffer 110 may output a hit signal HIT or a miss signal MISS in response to the request REQUEST. The hit signal HIT may include an embedding vector corresponding to the request REQUEST.

Referring to FIGS. 4 and 9, FAVs may be stored in the buffer 110 in the offline section. Also, in the online section, the buffer 110 outputs the hit signal HIT when the embedding vector corresponding to the request REQUEST matches one of the stored FAVs 31 and outputs the miss signal MISS when the embedding vector corresponding to the request REQUEST matches none of the stored FAVs 31.

FIG. 10 is a block diagram showing the buffer 110 according to an embodiment.

Referring to FIG. 10, the buffer 110 may store the FAVs 31 in a tag array format.

In the tag array format, each data block may be identified by a tag including an address. In other words, a tag is a part of a memory address and may indicate the address of data stored at a specific location in a memory.

Referring to FIG. 10, the buffer 110 may access a tag array 50 to determine whether a corresponding embedding vector is stored in a FAV buffer.

The request REQUEST may include an embedding table index including the corresponding embedding vector and the index of the corresponding embedding vector in the embedding table. Additionally, the request REQUEST may be represented as a vector, where the value the embedding table index and the value of the index of the embedding vector are concatenated. Furthermore, the tag array 50 shown in FIG. 10 may be a set of vectors where the value of the index of an embedding table including the corresponding embedding vector and the value of the index of the corresponding embedding vector in the corresponding embedding table are concatenated for all FAVs. In other words, each tag may include bits in which an embedding table number and an embedding vector row index in the corresponding embedding table are concatenated.

In other words, the buffer 110 may output the hit signal HIT or the miss signal MISS by comparing the value of an embedding table index included in a request REQUEST and the tag array 50 with the value of the index of the corresponding embedding vector.

When the value of the embedding table index included in the request REQUEST and the value of the index of the corresponding embedding vector in the embedding table are included in the tag array 50 (i.e., there is a match), the buffer 110 may output the hit signal HIT.

When the value of the embedding table index included in the request REQUEST and the value of the index of the corresponding embedding vector in the embedding table are not included in the tag array 50 (i.e., there is a mismatch), the buffer 110 may output the miss signal MISS.

Referring back to FIG. 9, in response to the hit signal HIT of the buffer 110, the pooling circuit 140 may perform a pooling operation on the corresponding embedding vector.

Here, along with the hit signal HIT, the pooling circuit 140 may receive a signal EMBEDDING VECTOR including an embedding vector corresponding to the request REQUEST. According to embodiments, the hit signal HIT may include an embedding vector corresponding to the request REQUEST.

In other words, the pooling circuit 140 may receive the hit signal HIT as an input value and output a pooled embedding vector POOLED EMBEDDING VECTOR by performing a pooling operation on the corresponding embedding vector.

Referring to FIG. 9, the pooling circuit 140 may provide a pooled embedding vector POOLED EMBEDDING VECTOR to the processor 10.

Referring to FIG. 9, in response to the miss signal MISS of the buffer 110, the address calculation circuit 120 may output a signal STARTING MEMORY ADDRESS AND MEMORY SIZE OF EMBEDDING VECTOR indicating a corresponding starting memory address and a corresponding memory size of the far-memory device 200 in which a corresponding embedding vector is stored. For the decoding circuit 130 to access a corresponding compressed embedding table from among the compressed embedding tables 41 stored in the far-memory device 200, the address calculation circuit 120 may provide the signal STARTING MEMORY ADDRESS AND MEMORY SIZE OF EMBEDDING VECTOR to the decoding circuit 130.

In other words, the address calculation circuit 120 may receive the miss signal MISS as an input value and output a signal STARTING MEMORY ADDRESS AND MEMORY SIZE OF EMBEDDING VECTOR by calculating a corresponding starting memory address and a corresponding memory size of the far-memory device 200 in which a corresponding embedding vector is stored.

To obtain values needed to calculate the starting memory address and the corresponding memory size of the far-memory device 200 in which the corresponding embedding vector is stored, the address calculation circuit 120 may access the mapping table 43 stored in the far-memory device 200.

FIG. 11 is a block diagram showing the address calculation circuit 120 according to an embodiment.

Referring to FIG. 11, the address calculation circuit 120 may include an address decoding circuit 121, a first register 123, and a second register 125.

To access a corresponding compressed embedding table from among the compressed embedding tables 41 stored in the far-memory device 200, the starting memory address of a corresponding embedding vector and the memory size of the corresponding embedding vector may be needed. Here, the starting memory address may be a physical memory address.

The first register 123 may store the MT address table 35 described with reference to FIGS. 4 and 8. The first register 123 may be an MT address register. The first register 123 may provide a MT address included in the MT address table 35 to the address decoding circuit 121.

The second register 125 may store the CET address table 37 described with reference to FIG. 4. The second register 125 may be a CET address register. The second register 125 may provide CET addresses included in the CET address table 37 to the address decoding circuit 121.

In response to the miss signal MISS, the address decoding circuit 121 may calculate the starting memory address of the corresponding compressed embedding vector and the memory size of the corresponding compressed embedding vector, thereby outputting the signal STARTING MEMORY ADDRESS AND MEMORY SIZE OF EMBEDDING VECTOR.

Also, in response to the miss signal MISS, the address decoding circuit 121 may access the mapping table 43 stored in the far-memory device 200 based on an MT address register corresponding to a corresponding embedding vector.

In other words, the address decoding circuit 121 may receive the miss signal MISS as an input value. Additionally, the address decoding circuit 121 may access the mapping table 43 stored in the far-memory device 200 using an MT address register corresponding to the embedding vector. This allows the address decoding circuit 121 to obtain the values needed to calculate the start memory address and the memory size of the corresponding embedding vector from the mapping table 43.

According to an embodiment, the address decoding circuit 121 may calculate the starting memory address of the corresponding embedding vector based on Equation 2 below. Here, it is assumed that the corresponding embedding vector has an index of N in a corresponding embedding table (i.e., the corresponding embedding vector is located at a N-th row in the corresponding embedding table).

$$Addr_S = Addr_{CET} + 6 \times d + 8 \times MT[N-1] \quad \text{[Equation 2]}$$

Here, $Addr_S$ may denote the starting memory address of a corresponding embedding vector, $Addr_{CET}$ may denote the starting memory address of a corresponding compressed embedding table, d may denote the total number of elements included in one embedding vector, and MT[N−1] may denote the value of a N−1-th row of a mapping table corresponding to the corresponding embedding table.

In other words, the address decoding circuit 121 may calculate the starting memory address of the corresponding compressed embedding vector based on the starting memory address $Addr_{CET}$ of the corresponding compressed embedding table and a value MT[N−1] of a row immediately before a corresponding row of the mapping table corresponding to the corresponding embedding table. Here, the value MT[N−1] of the row immediately before the corresponding row of the mapping table corresponding to the embedding table may correspond to the cumulative number of embedding vectors compressed to 14-bit size in the mapping table to the corresponding row (a N-th row).

Additionally, the address decoding circuit 121 may calculate the memory size of the corresponding embedding vector based on Equation 3 and Equation 4 below.

$$Addr_N = Addr_{CET} + 6 \times d + 8 \times MT[N] \quad \text{[Equation 3]}$$

$$Len_V = Addr_N - Addr_S \quad \text{[Equation 4]}$$

Here, $Addr_N$ may denote the starting memory address of an embedding vector located at the next row of the corresponding embedding vector (i.e., the embedding vector located at the N+1-th row of the corresponding embedding table), $Addr_{CET}$ may denote the starting memory address of a corresponding compressed embedding table, d may denote the total number of elements included in one embedding vector, and MT[N] may denote the value of a N-th row of the mapping table corresponding to the corresponding embedding table. $Len_V$ may represent the memory size (i.e., the length of data) of the corresponding embedding vector, and $Addr_S$ may represent the starting memory address of the corresponding embedding vector.

In other words, the address decoding circuit 121 may calculate the memory size of the corresponding embedding vector based on the starting memory address $Addr_S$ of the corresponding embedding vector and the starting memory address $Addr_N$ of an embedding vector next to the corresponding embedding vector.

Referring back to FIG. 9, in response to the signal STARTING MEMORY ADDRESS AND MEMORY SIZE OF EMBEDDING VECTOR from the address calculation circuit 120, the decoding circuit 130 may access the compressed embedding tables 41 stored in the far-memory device 200 to obtain the corresponding compressed embedding vector.

In other words, the decoding circuit 130 may receive the signal STARTING MEMORY ADDRESS AND MEMORY SIZE OF EMBEDDING VECTOR as an input value and access the compressed embedding tables 41 stored in the far-memory device 200, thereby obtaining the corresponding compressed embedding vector included in a corresponding compressed embedding table.

Thereafter, the decoding circuit 130 may output a signal EMBEDDING VECTOR, which includes the embedding vector corresponding to the request REQUEST, by decoding the corresponding compressed embedding vector. The signal EMBEDDING VECTOR is provided to the pooling circuit 140.

Figure 12:
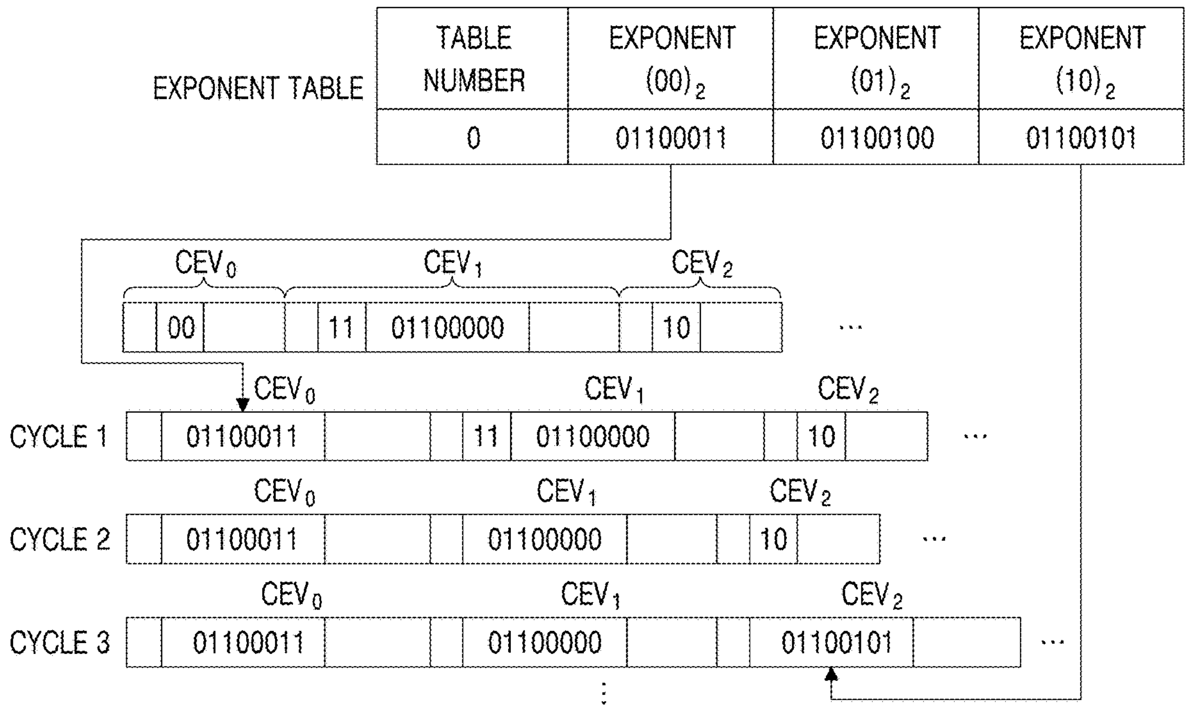
FIG. 12 is a block diagram illustrating the operation of a decoding circuit included in a near-memory device in an online section, according to an embodiment.

FIG. 12 is a block diagram illustrating an operation of the decoding circuit 130 according to an embodiment.

Referring to FIG. 12, an example of an exponent table and a 0-th compressed embedding vector element CEV0, a first compressed embedding vector element CEV1, and a second compressed embedding vector element CEV2 for one compressed embedding vector are shown.

Here, the decoding circuit 130 may sequentially decode elements of an embedding vector in synchronization with a clock signal. According to some embodiments, one compressed embedding vector element may be decoded per clock cycle.

The decoding circuit 130 may replace bit values of the exponent bits E of a compressed embedding vector element with bit values included in an exponent table or remove the MSB and the SMSB from among the exponent bits E of the compressed embedding vector element, based on bit values of the MSB and the SMSB of the exponent bits E of the compressed embedding vector element.

Referring to FIG. 12, from among the exponent bits E of the 0-th compressed embedding vector element CEV0, the MSB is 0 and the SMSB is 0, and thus, the bit value of the exponent bits E of the 0-th compressed embedding vector element CEV0, which is 00, may be replaced with 01100011 (see CYCLE 1). From among the exponent bits E of the first compressed embedding vector element CEV1, the MSB is 1 and the SMSB is 1, and thus, the bit value of the exponent bits E of the first compressed embedding vector element CEV1, which is 11, may be removed (see CYCLE 1). From among the exponent bits E of the second compressed embedding vector element CEV2, the MSB is 1 and the SMSB is 0, and thus, the bit value of the exponent bits E of the second compressed embedding vector element CEV2, which is 10, may be replaced with 01100101 (see CYCLE 3).

Referring back to FIG. 9, the decoding circuit 130 may provide a signal EMBEDDING VECTOR including the embedding vector corresponding to the request REQUEST to the pooling circuit 140 by decoding the corresponding compressed embedding vector.

In response to a signal EMBEDDING VECTOR of the decoding circuit 130, the pooling circuit 140 may perform a pooling operation on the corresponding embedding vector.

In other words, the pooling circuit 140 may receive the signal EMBEDDING VECTOR as an input value and output a pooled embedding vector POOLED EMBEDDING VECTOR by performing a pooling operation on the corresponding embedding vector. As in the case of the hit signal HIT, the pooling circuit 140 may provide a pooled embedding vector POOLED EMBEDDING VECTOR to the processor 10.

By performing quantization and compression methods for embedding vector components, as described above, the data size of an embedding table can be effectively reduced.

Additionally, by performing near-memory processing based on the descriptions given above, both the time and the energy consumption for embedding table lookup and pooling can be significantly reduced.

Figure 13:
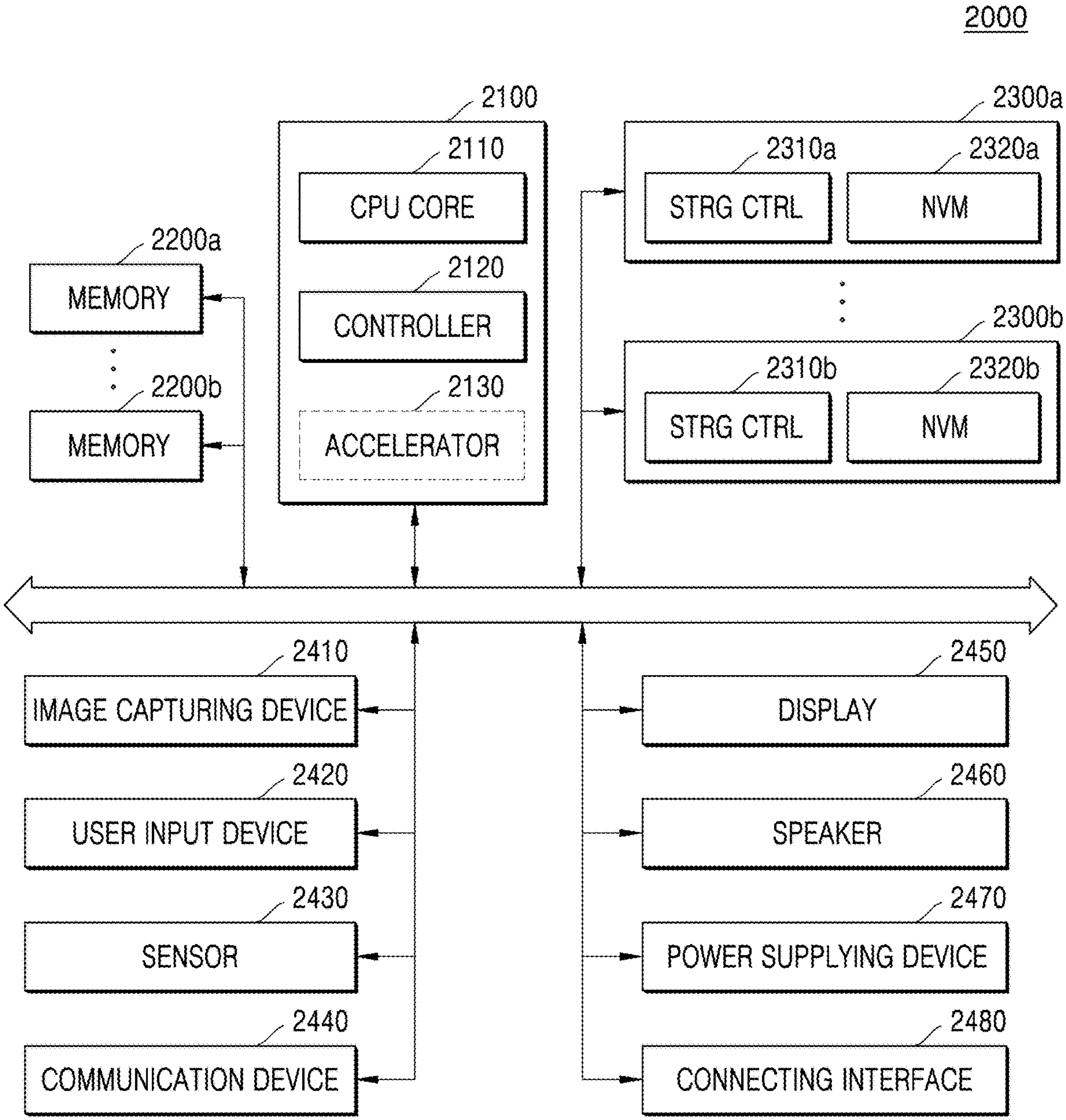
FIG. 13 is a block diagram illustrating an electronic device according to an embodiment of the inventive concept.

FIG. 13 is a block diagram illustrating an electronic device according to an embodiment of the inventive concept.

Referring to FIG. 13, a system 2000 of FIG. 13 may be a mobile system such as a mobile phone, a smart phone, a tablet personal computer (PC), a wearable device, a healthcare device, or an Internet of Things (IoT) device. However, the system 2000 of FIG. 13 is not necessarily limited to a mobile system and may include a PC, a laptop computer, a server, a media player, or automobile device such as a navigation device. The system 2000 may be referred to as an electronic device. Here, the system 2000 may correspond to the electronic device 1 of FIG. 1.

Referring to FIG. 13, the system 2000 may include a main processor 2100, memories 2200*a* and 2200*b*, and storage devices 2300*a* and 2300*b*, and may additionally include at least one of an image capturing device 2410, a user input device 2420, a sensor 2430, a communication device 2440, a display 2450, a speaker 2460, a power supplying device 2470, and a connecting interface 2480. The main processor 2100 may correspond to the processor 10 of FIG. 1.

The main processor 2100 may control the overall operation of the system 2000, and more particularly, the operations of other components constituting the system 2000. The main processor 2100 may be implemented by a general-purpose processor, a dedicated processor, or an application processor.

The main processor 2100 may include one or more CPU cores 2110 and may further include a controller 2120 for controlling the memories 2200*a* and 2200*b* and/or the storage devices 2300*a* and 2300*b*. According to embodiments, the main processor 2100 may further include an accelerator 2130, which is a dedicated circuit for high-speed data operation such as an artificial intelligence (AI) data operation. The accelerator 2130 may include a graphics processing unit (GPU), a neural processing unit (NPU), and/or a data processing unit (DPU) and may also be implemented as a separate chip physically independent from the other components of the main processor 2100.

The memories 2200*a* and 2200*b* may be used as the main memory device of the system 2000 and may include volatile memories such as SRAMs and/or DRAMs. However, the inventive concept is not limited thereto, and the memories 2200*a* and 2200*b* may also include non-volatile memories such as flash memories, PRAMs, and/or RRAMs. The memories 2200*a* and 2200*b* may be implemented in the same package as the main processor 2100.

The storage devices 2300*a* and 2300*b* may function as non-volatile storage devices that store data regardless of whether power is supplied thereto, and may have a relatively large storage capacity compared to the memories 2200*a* and 2200*b*. The storage devices 2300*a* and 2300*b* may include storage controllers 2310*a* and 2310*b* and non-volatile memories (NVMs) 2320*a* and 2320*b* that store data under the control of the storage controllers 2310*a* and 2310*b*. The NVMs 2320*a* and 2320*b* may include a flash memory having a 2-dimensional (2D) structure or a 3-dimensional (3D) V-NAND (vertical NAND) structure, but may also include other types of non-volatile memories such as PRAM and/or RRAM.

The storage devices 2300*a* and 2300*b* may be included in the system 2000 but physically separated from the main processor 2100 or may be implemented in the same package as the main processor 2100. Additionally, the storage devices 2300*a* and 2300*b* may be solid state devices (SSDs) or memory cards, and thus, the storage devices 2300*a* and 2300*b* may be detachably attached to the other components of the system 2000 through an interface such as a connecting interface 2480 to be described below. The storage devices 2300*a* and 2300*b* may be devices to which standard protocols like universal flash storage (UFS), embedded multimedia card (eMMC), or non-volatile memory express (NVMe) are applied, but are not necessarily limited thereto.

Here, the memory device 20 of FIG. 1 may correspond to the memories 2200*a* and 2200*b* and/or the storage devices 2300*a* and 2300*b*.

The image capturing device 2410 may capture a still image or a moving picture and may include a camera, a camcorder, and/or a webcam.

The user input device 2420 may receive various types of data input from a user of the system 2000 and may include a touch pad, a keypad, a keyboard, a mouse, and/or a microphone.

The sensor 2430 may sense various types of physical quantities that may be obtained from outside the system 2000 and transform the sensed physical quantities into electrical signals. The sensor 2430 may include a temperature sensor, a pressure sensor, an illuminance sensor, a positional sensor, an acceleration sensor, a biosensor, and/or a gyroscope sensor.

The communication device 2440 may transmit and receive signals to and from other devices outside the system 2000 according to various communication protocols. The communication device 2440 may include an antenna, a transceiver, and/or a modem.

The display 2450 and the speaker 2460 may function as output devices that output visual and auditory information to a user of the system 2000, respectively.

The power supplying device 2470 may convert power supplied from a battery embedded in the system 2000 and/or power supplied from an external power source and supply the converted power to the components of the system 2000.

The connecting interface 2480 may provide a connection between the system 2000 and an external device, which is capable of being connected to the system 2000 and exchanging data with the system 2000. The connecting interface 2480 may be implemented as one of various interface protocols such as advanced technology attachment (ATA), serial ATA (ATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), a secure digital (SD) card, a multi-media card (MMC), an eMMC, universal flash storage (UFS), an embedded UFS (eUFS), and a compact flash (CF) card interface.

While the inventive concept has been particularly shown and described with reference to embodiments thereof, it will be understood that various changes in form and details may be made therein without departing from the spirit and scope of the inventive concept as set forth in the following claims.

What is claimed is:

1. A memory device comprising a near-memory device and a far-memory device, wherein the far-memory device stores compressed embedding vectors, the near-memory device comprising:

a buffer configured to receive a request for pooling an embedding vector and to output a hit signal or a miss signal in response to the request, wherein the hit signal includes the embedding vector corresponding to the request;

an address calculation circuit configured to calculate a starting memory address and a memory size of the embedding vector corresponding to the request in response to the miss signal;

a decoding circuit configured to obtain a compressed embedding vector corresponding to the request from the far-memory device based on the starting memory address and the memory size, and to output the embedding vector corresponding to the request by decoding the compressed embedding vector; and a pooling circuit configured to output a pooled embedding vector by performing a pooling operation on the embedding vector, wherein the pooling circuit obtains the embedding vector from the hit signal or obtains the embedding vector from the decoding circuit, and the buffer stores embedding vectors with access frequencies higher than a pre-set value from all embedding vectors.

2. The memory device of claim 1, wherein elements of a compressed embedding vector stored in the far-memory device are quantized by retaining a pre-defined number of most significant bits from mantissa bits and removing the remaining mantissa bits.

3. The memory device of claim 1, wherein elements of a compressed embedding vector stored in the far-memory device are compressed by mapping an exponent bit to an exponent bit with two bits or adding two bits with a first bit value between a sign bit and an exponent bit, based on bit values of exponent bits.

4. The memory device of claim 1, wherein the address calculation circuit is further configured to obtain values needed for calculating the starting memory address and the memory size from a mapping table stored in the far-memory device.

5. The memory device of claim 4, wherein the address calculation circuit is further configured to calculate a starting memory address of the compressed embedding vector corresponding to the request, based on a starting memory address of a compressed embedding table corresponding to the request and a value of the mapping table corresponding to the request.

6. The memory device of claim 4, wherein the address calculation circuit is further configured to calculate a memory size of the compressed embedding vector corresponding to the request, based on a starting memory address of the compressed embedding vector corresponding to the request and a starting memory address of an embedding vector next to the compressed embedding vector corresponding to the request.

7. The memory device of claim 1, wherein the decoding circuit is further configured to replace bit values of exponent bits of a compressed embedding vector element with bit values included in an exponent table, or to remove a most significant bit (MSB) and a second most significant bit (SMSB) from exponent bits of the compressed embedding vector element, based on the MSB and the SMSB of the exponent bits of the compressed embedding vector element.

8. An electronic device comprising a near-memory device and a far-memory device, the electronic device comprising a processor configured to control the near-memory device and the far-memory device, wherein the far-memory device stores compressed embedding vectors, the near-memory device comprising:

a buffer configured to receive a request for pooling an embedding vector and to output a hit signal or a miss signal in response to the request, wherein the hit signal comprises the embedding vector corresponding to the request;

an address calculation circuit configured to calculate a starting memory address and a memory size of the embedding vector corresponding to the request in response to the miss signal;

a decoding circuit configured to obtain a compressed embedding vector corresponding to the request from the far-memory device based on the starting memory address and the memory size, and to output the embedding vector corresponding to the request by decoding the compressed embedding vector; and a pooling circuit configured to output a pooled embedding vector by performing a pooling operation on the embedding vector, wherein the pooling circuit obtains the embedding vector from the hit signal of the buffer or obtains the embedding vector from the decoding circuit, and the buffer stores embedding vectors with access frequencies higher than a pre-set value from all embedding vectors.

9. The electronic device of claim 8, wherein elements of a compressed embedding vector stored in the far-memory device are quantized by retaining a pre-defined number of most significant bits from mantissa bits and removing the remaining mantissa bits.

10. The electronic device of claim 8, wherein elements of a compressed embedding vector stored in the far-memory device are compressed by mapping an exponent bit to an exponent bit with two bits or adding two bits with a first bit value between a sign bit and an exponent bit, based on bit values of exponent bits.

11. The electronic device of claim 8, wherein the address calculation circuit is further configured to obtain values needed to calculate the starting memory address and the memory size from a mapping table stored in the far-memory device.

12. The electronic device of claim 11, wherein the address calculation circuit is further configured to calculate a starting memory address of the compressed embedding vector corresponding to the request, based on a starting memory address of a compressed embedding table corresponding to the request and a value of the mapping table corresponding to the request.

13. The electronic device of claim 11, wherein the address calculation circuit is further configured to calculate a memory size of the compressed embedding vector corresponding to the request, based on a starting memory address of the compressed embedding vector corresponding to the request and a starting memory address of an embedding vector next to the compressed embedding vector corresponding to the request.

14. The electronic device of claim 8, wherein the decoding circuit is further configured to replace bit values of exponent bits of a compressed embedding vector element with bit values included in an exponent table, or to remove a most significant bit (MSB) and a second most significant bit (SMSB) from exponent bits of the compressed embedding vector element, based on the MSB and the SMSB of the exponent bits of the compressed embedding vector element.

15. A near-memory device comprising:

a buffer configured to receive a request for pooling an embedding vector and output a hit signal or a miss signal in response to the request, wherein the hit signal comprises the embedding vector corresponding to the request;

an address calculation circuit configured to calculate a starting memory address and a memory size of the embedding vector corresponding to the request in response to the miss signal;

a decoding circuit configured to obtain a compressed embedding vector corresponding to the request from a far-memory device based on the starting memory address and the memory size, and to output the embedding vector corresponding to the request by decoding the compressed embedding vector; and a pooling circuit configured to output a pooled embedding vector by performing a pooling operation on the embedding vector, wherein the pooling circuit obtains the embedding vector from the hit signal of the buffer or obtains the embedding vector from the decoding circuit, and wherein the buffer stores embedding vectors with access frequencies higher than a pre set value from all embedding vectors.

16. The near-memory device of claim 15, wherein elements of a compressed embedding vector stored in the far-memory device are quantized by retaining a pre-defined number of most significant bits from mantissa bits and removing the remaining mantissa bits.

17. The near-memory device of claim 15, wherein elements of a compressed embedding vector stored in the far-memory device are compressed by mapping an exponent bit to an exponent bit with two bits or adding two bits with a first bit value between a sign bit and an exponent bit, based on bit values of exponent bits.

18. The near-memory device of claim 15, wherein the address calculation circuit is further configured to obtain values needed to calculate the starting memory address and the memory size from a mapping table stored in the far-memory device.

19. The near-memory device of claim 18, wherein the address calculation circuit is further configured to calculate a starting memory address of the compressed embedding vector corresponding to the request, based on a starting memory address of a compressed embedding table corresponding to the request and a value of the mapping table corresponding to the request.

20. The near-memory device of claim 18, wherein the address calculation circuit is further configured to calculate a memory size of the compressed embedding vector corresponding to the request, based on a starting memory address of the compressed embedding vector corresponding to the request and a starting memory address of an embedding vector next to the compressed embedding vector corresponding to the request.

* * * * *